United States Patent [19]

Duerksen et al.

[11] Patent Number: 4,556,107
[45] Date of Patent: Dec. 3, 1985

[54] STEAM INJECTION INCLUDING ALPHA-OLEFIN SULFONATE DIMER SURFACTANT ADDITIVES AND A PROCESS OF STIMULATING HYDROCARBON RECOVERY FROM A SUBTERRANEAN FORMATION

[75] Inventors: John H. Duerksen, Fullerton; Robert G. Wall, Pinole; Jack D. Knight, Berkeley, all of Calif.

[73] Assignee: Chevron Research Company, San Francisco, Calif.

[21] Appl. No.: 489,649

[22] Filed: Apr. 28, 1983

[51] Int. Cl.$^4$ .............................................. E21B 43/24
[52] U.S. Cl. .................................... 166/272; 166/273; 166/309; 252/8.55 D
[58] Field of Search ................................ 166/272–275, 166/303, 309; 252/8.55 D

[56] References Cited

U.S. PATENT DOCUMENTS

| | | |
|---|---|---|
| B 529,836 | 2/1976 | Needham ............................ 166/303 |
| B 569,519 | 2/1976 | Clampitt ............................ 166/272 |
| 3,357,487 | 12/1967 | Gilchrist et al. . |
| 3,412,793 | 11/1968 | Needham ........................ 166/272 X |
| 3,463,231 | 8/1969 | Hutchison et al. ................ 166/303 |
| 3,721,707 | 3/1973 | Straus et al. .................... 252/554 X |
| 3,951,823 | 4/1976 | Straus et al. .................... 252/8.5 C |
| 3,953,338 | 4/1976 | Straus et al. .................... 252/8.5 C |
| 4,072,191 | 2/1978 | Clampitt ............................ 166/261 |
| 4,085,800 | 4/1978 | Engle et al. ........................ 166/288 |
| 4,086,964 | 5/1978 | Dilgren et al. .................... 166/272 |
| 4,148,217 | 4/1979 | Engle ................................. 73/60.1 |
| 4,161,217 | 7/1979 | Dilgren et al. .................... 166/252 |
| 4,393,937 | 7/1983 | Dilgren et al. ............. 252/8.55 D X |
| 4,417,088 | 11/1983 | Miller ................................. 585/533 |

OTHER PUBLICATIONS

SPE 10774—"The Laboratory Development and Field Testing of Steam/Noncondensible Gas Foams for Mobility Control in Heavy Oil Recovery" by Richard E. Dilgren, Arthur R. Deemer and Kenneth B. Owens (Society of Petroleum Engineers of AIME), 1982.
SPE 10775—"Evaluation of a Conventional Steam Drive with Ancillary Materials: North Kern Front Field" by Rod L. Eson and Stephen K. O'Nesky, Chemical Oil Recovery Co., (Society of Petroleum Engineers of AIME), 1982.
SPE—10777—"Steam Surfactant Systems at Reservoir Conditions" by Ali Habib Al-Khafaji, Pin-Ton Fred Wang, Louis M. Castanier, and William E. Brigham, Stanford Petroleum Research Institute (Society of Petroleum Engineers of AIME), 1982.
SPE/DOE 9777—"Field Demonstration of Steam Drive with Ancillary Materials" by T. M. Doscher and E. C. Hammershaimb, CLD, Inc., Society of Petroleum Engineers, U.S. Department of Energy, 1981.
"A Field Experiment of Steam Drive with In-Situ Foaming", by Olga P. Malito, Subir K. Sanyal and William E. Brigham, Second Annual Report—Oct. 1, 1981–Sep. 30, 1982, Stanford University, Petroleum Research Institute.
SPE 12785—"Laboratory Study of Foaming Surfactants as Steam-Diverting Additives" by J. H. Duerksen, Chevron Oil Field Research Co. (Society of Petroleum Engineers of AIME), 1944.

*Primary Examiner*—George A. Suchfield
*Attorney, Agent, or Firm*—S. R. LaPaglia; E. J. Keeling; A. Stephen Zavell

[57] ABSTRACT

An improved steam injection process for recovering hydrocarbons from a subterranean formation. The process includes the use of alpha-olefin sulfonate dimer surfactants in the steam to form a foam-steam drive medium which is injected into the formation through at least one injection well to enhance the recovery of hydrocarbons from at least one production well.

29 Claims, No Drawings

STEAM INJECTION INCLUDING ALPHA-OLEFIN SULFONATE DIMER SURFACTANT ADDITIVES AND A PROCESS OF STIMULATING HYDROCARBON RECOVERY FROM A SUBTERRANEAN FORMATION

BACKGROUND OF THE INVENTION

This invention relates to enhanced oil recovery. More specifically, this invention relates to a process of enhancing oil recovery with steam injection.

Many hydrocarbons are too thick to be recovered from subterranean petroleum containing formations without assistance. These hydrocarbons are either the residual oil left in a depleted reservoir or virgin heavy hydrocarbons. These heavy hydrocarbons can be recovered through the use of steam drives which heat the formation, lower the viscosity of the hydrocarbons,, and enhance the flow of the hydrocarbons toward a production well. However, after initial steam injection breakthrough at the production well, the steam injection preferentially follows the path of the breakthrough. Thus, the total amount of the formation that is swept by the steam injection is limited. Commercial surfactants, such as Thermophoam BW-D®, a product of the FarBest Company, and Stepanflo 30®, a product of the Stepan Company, have been injected along with steam to create a steam-foam flood. The surfactants form a foam that inhibits the flow of the steam into that portion of the formation containing only residual oil saturation. Residual oil saturation is defined as the immobile oil remaining in that portion of the reservoir swept steam. This forces the steam to drive the recoverable hydrocarbons from the less depleted portions of the reservoir toward the production well(s).

To maximize the extraction of hydrocarbons from a formation, it would be highly desirable to have superior foaming surfactants which inhibit the flow of steam in a steam zone containing only residual oil saturation. Furthermore, it would be desirable to have the surfactants in a steam foam recovery process which inhibit the flow of the steam in the zone which contains only the residual oil and enhance the flow of steam in the zone which contains the recoverable hydrocarbons. However, it is desirable not to have the flow of the recoverable hydrocarbons inhibited in the steam zone having an oil saturation greater than the residual oil saturation.

SUMMARY OF THE INVENTION

We have invented a foam surfactant steam process for recovering hydrocarbons from a subterranean formation. The process comprises the injection of a class of $C_5$–$C_{24}$ alpha-olefin sulfonate dimers as foaming surfactants into the steam injection at at least one injection well to enhance the recovery of hydrocarbons from at least one production well. The superior foaming characteristics of the alpha-olefin sulfonate dimers enhance the sweeping of the steam through the formation. This enhances the recovery of hydrocarbons at the production well. Unexpectedly, the foam surfactant-steam combination recovers additional hydrocarbons from the formation swept by only steam compared to known surfactant steam combination. The foamable mixture of steam, surfactant and (optionally) non-condensible gas is injected into the formation at an injection well and displaced toward the production well with either additional foamable mixture or steam alone to recover the hydrocarbons from the formation.

DETAILED DESCRIPTION OF THE INVENTION

Foaming surfactants for steam injection can be evaluated by comparing several properties of the foams. These properties are resistance factors, (R), which are determined by the pressure drop across a foam generator or a sandpack with simultaneous flow of steam, and optionally non-condensible gas, and brine as illustrated and at the following conditions: (1) at residual oil saturation with and without surfactant, and (2) at mobile oil saturation with and without surfactant. The resistance factors are defined in Table I.

TABLE I

| Resistance Factor | Definition | Relation to Reservoir | Desired Value |
|---|---|---|---|
| $R_1$ | $\dfrac{\Delta P(\text{Surfactant} + \text{Brine} + \text{optional (NCD)} + S_{or})}{\Delta P(\text{Brine} + \text{optional (NCD)} + SO_{or})}$ | $\dfrac{\Delta P \text{ in stm zone at } S_{or} \text{ w/foam}}{\Delta P \text{ in stm zone at } S_{or} \text{ wo/foam}}$ | High |
| $R_2$ | $\dfrac{\Delta P(\text{Surfactant} + \text{Brine} + \text{optional (NCD)} + S_{or})}{\Delta P(\text{Surfactant} + \text{Brine} + \text{optional (NCD)} + S_o)}$ | $\dfrac{\Delta P \text{ in stm zone at } S_{or} \text{ w/foam}}{\Delta P \text{ in stm zone at } S_o \text{ w/foam}}$ | High |
| $R_3$ | $\dfrac{\Delta P(\text{Surfactant} + \text{Brine} + \text{optional (NCD)} + S_o)}{\Delta P(\text{Brine} + \text{optional (NCD)} + S_o)}$ | $\dfrac{\Delta P \text{ in stm zone at } S_o \text{ w/foam}}{\Delta P \text{ in stm zone at } S_o \text{ wo/foam}}$ | Low (pref. < 1) |

$\Delta P$ = Pressure drop across foam generator
$S_{or}$ = Residual oil saturation
$S_o$ = Oil saturation ($S_o > S_{or}$)
Stm = Steam
w = with
wo = without
NCD = Non-condensible Gas A high value of $R_1$ indicates that the surfactant has the capability to create a foam that strongly inhibits the flow of steam in a steam zone containing residual oil. This parameter has been used before to evaluate surfactants and steam floods. Higher $R_1$ values indicate more desirable the surfactants. In addition, resistance factors $R_2$ and $R_3$ are also important for evaluating surfactant effectiveness. A high value of $R_2$ indicates the surfactant makes a much stronger flow inhibiting foam in a steam zone with residual oil than it makes in a steam zone with recoverable hydrocarbons. This has the effect of blocking off that portion of the formation which has been swept of recoverable hydrocarbons and forces the additional steam injection to drive the recoverable hydrocarbons toward the production well. $R_3$ values should approach one and preferably be less than 1. An $R_3$ value less than one indicates that the surfactant itself has the ability to actually improve the flow of recoverable hydrocarbons in the steam zone relative to the absence of surfactant. Thus, high values of $R_1$ and $R_2$ and a value of $R_3$ less than 1.0 would indicate the most desirable surfactants to divert steam from the depleted zone of the reservoir and to accelerate the growth of the steam zone and thereby to accelerate and increase the production of crude oil for a given amount of steam injection.

The surfactants of the present invention exhibit superior $R_1$-$R_3$ values to standard surfactants, such as Siponate A168 ®, Thermophoam BW-D ® and Stepanflo 30 ®. These known surfactants are alpha-olefin sulfonates having an olefin chain from $C_{16}$-$C_{18}$.

The surfactants of the invention are the dimers of alpha-olefin sulfonates wherein the monomers have a carbon chain length of from about $C_5$ to about $C_{24}$. In other words, the dimer has a chain length of $C_{10}$-$C_{48}$. The dimers derived from the monomers of $C_{11}$-$C_{20}$ alpha-olefin sulfonates are preferred. These preferred dimers are alpha-olefin sulfonate dimers in the range of $C_{22}$-$C_{40}$. The dimers of $C_{15}$-$C_{20}$ alpha-olefin sulfonates are most preferred. These most preferred dimers are alpha-olefin sulfonate dimers in the range of $C_{30}$-$C_{40}$. Mixtures of the alpha-olefin sulfonate dimers can be employed to optimize the recovery of hydrocarbons from a particular formation. The alpha-olefin sulfonate dimers can be prepared by any known process. For example, the dimers of the monomers are complex mixtures of compounds which can be prepared by heating the monomers at a temperature above about 110° C. as disclosed in U.S. Pat. No. 3,721,707, completely incorporated herein by reference. For convenience, the mixture is referred to as alpha olefin sulfonate alpha-olefin sulfonate dimers. Of course, a specific dimer can be prepared by starting with a specific monomer.

The injection and production wells can be arranged in any pattern. For example, a two-spot, a three-spot, a regular four-spot, a skewed four-spot, a five-spot, a seven-spot, an inverted seven-spot, and the like. Suitable patterns are described in The Reservoir Engineering Aspects of Waterflooding by Forrest F. Craig, Jr., Society of Petroleum Engineers of AIME, 1971, page 49, incorporated herein by reference. Preferably, the injection well is surrounded by production wells, i.e., regular four-spot and five-spot patterns.

Any standard method of creating a steam surfactant foam is suitable for use in the invention. Preferably, the method provides for the incorporation of a non-condensible gas, such as nitrogen, carbon dioxide, carbon monoxide, air and the like, into the steam foam surfactant combination. A preferred process of creating the foam and gravity override sweeping the formation is disclosed in U.S. Application entitled "Steam, Non-Condensible Gas and Foam for Steam and Distillation Drives in Subsurface Petroleum Formation" by John H. Duerksen, filed Mar. 18, 1983, and assigned U.S. Ser. No. 476,642 now U.S. Pat. No. 4,488,598. The process disclosed therein is completely incorporated herein by reference. Alternatively, the procedures outlined in U.S. Pat. No. 4,086,964 completely incorporated herein by reference can be employed. In addition, the procedures outlined in U.S. Pat. Nos. 4,085,800 and 3,412,793, completely incorporated herein by reference, can be used with producing formations that contain zones of high permeability and/or are susceptible to channeling. In those formations, the high permeability zones are plugged to enhance the recovery of hydrocarbons from the zones of lower permeability.

The form is created by heating water to its boiling point at formation pressure [212° F. (100° C.) or higher] to form a steam. For California heavy oil reservoirs the steam temperature is typically in the range 250°-400° F. Typically, 80 percent or less of the water fed to the boiler is converted to steam; the rest remains as hot water. Thereafter, the surfactant is injected into the wet steam in an amount of from about 0.01% to about 10% of the liquid phase of the steam. Preferably, the surfactant is injected in as small an amount as possible to enhance the oil recovery. This is on the order to about 0.1% to about 1% surfactant present in the liquid phase. Optionally, sufficient non-condensible gas is injected into the wet steam such that the gas phase composition is from about 1 to about 50% non-condensible gas and from about 99 to about 50% gaseous steam by volume. The wet steam with its associated surfactant and non-condensible gas is injected into an injection well at a rate determined by reservoir characteristics and well pattern area. Typically, steam is injected into each injection well at about 500 barrels per day, (BPD), of cold water equivalent. Optionally, the water for forming the steam can contain other additives which enhance its properties such as scale inhibitors, cosurfactants, and the like. The water can also contain salts.

The process is carried out in the following procedure to minimize the cost of the operation. Initially, a first slug of steam is injected into the formation for a sufficient time to form a steam zone and a hot water zone in the subterranean formation containing the hydrocarbons. The steam injection is continued until there is steam breakthrough at the production well. This recovers the mobile oil in the steam-swept portion of the formation. Thereafter, a second slug of steam, surfactant and (optionally) non-condensible gas is injected. This slug diverts the steam from the area of breakthrough and forces it to sweep through undepleted portions of the formation to recover additional hydrocarbons. Slugs of steam, surfactant and gas can be alternated with slugs of pure steam. Optionally, the slugs can be tapered compositionally from one slug into the next to form a smooth transition or steam-surfactant-gas injection can be continuous. Finally, pure steam is injected to sweep the last portion of the formation.

Having described the invention, the following examples are illustrative of the superior surfactants and process of recovery. However, it should be understood that the examples are not intended to limit the scope of the invention. Modifications which should be obvious to the ordinary skilled artisan are contemplated to be within the scope of the invention.

EXAMPLES

The alpha-olefin sulfonate dimers were compared with other surfactants by the stainless-steel wool pack procedure to evaluate their performance. Steam-foam flow tests were run in a ¼ inch diameter by 2½ inch long stainless-steel-wool pack containing brine (1% NaCl+500 ppm $CaCl_2$) and Kern River crude oil at 400° F. The gas phase of the generated foam consisted of equal volumes of steam and nitrogen (40 cc per minute total at conditions). The liquid phase flow rate was 3.25 ml/min. containing approximately 0.5% by weight active sulfonate. The results are given in Table II.

TABLE II

| Surfactant | Resistance Factor | | |
|---|---|---|---|
| | $R_1$ | $R_2$ | $R_3$ |
| Commercial Sulfonates | | | |
| Suntech IV (ATS) | 19.4 | 2.21 | 1.30 |
| Stepanflo 30 ($C_{16-18}$ LAOS) | 21.9 | 1.29 | 2.51 |
| Siponate A 168 ($C_{16-18}$ BAOS) | 19.2 | 1.14 | 2.48 |
| Alkylaryl Sulfonates | | | |
| $C_{12-16}$ ABS | 15.6 | 1.15 | 2.01 |
| $C_{12-16}$ ATS | 14.5 | 1.57 | 1.36 |
| $C_{15-18}$ ATS | 17.2 | 1.41 | 1.81 |
| $C_{21}$ ATS | 19.2 | 1.59 | 1.79 |
| $C_{12-16}$ AXS | 13.3 | 2.15 | 0.92 |
| Alpha-Olefin Sulfonates | | | |
| $C_{7-20}$ AOS | 25.7 | 2.94 | 1.29 |
| $C_{15-18}$ AOS | 22.0 | 2.59 | 1.23 |
| $C_{15-20}$ AOS | 21.2 | 1.27 | 2.47 |
| Alpha-Olefin Sulfonate Dimers | | | |
| Dimer of $C_{11-14}$ AOS | 26.5 | 4.67 | 0.85 |
| Dimer of $C_{13-14}$ AOS | 21.2 | 4.15 | 0.76 |
| Dimer of $C_{15-18}$ AOS | 22.4 | 4.97 | 0.67 |
| Dimer of $C_{15-20}$ AOS | 26.1 | 5.75 | 0.67 |

ATS = alkyl toulene sulfonate
LAOS = linear alpha olefin sulfonate
BAOS = branched alpha olefin sulfonate
AOS = alpha olefin sulfonate
ABS = alkyl benzene sulfonate
AXS = alkyl xylene sulfonate $R_1$, $R_2$ and $R_3$ values were obtained for both commercial and experimental surfactants. Three classes of sulfonates were tested: alkylaryl sulfonates, alpha olefin sulfonates, and alpha olefin sulfonate dimers (Table II). The alpha olefin sulfonates and alpha-olefin sulfonate dimers gave better $R_1$ values than the alkylaryl sulfonate, but the alpha-olefin sulfonate dimers gave significantly better $R_2$ and $R_3$ values than either the alkylaryl sulfonates or the alpha olefin sulfonates.

Further comparisons were made with the sandpack procedure. Steam flow tests were run at 400° F. in a ¾" diameter by 6" long pipe packed with 140 mesh Ottawa sand. These sandpacks were saturated with heavy Kern River reservoir crude oil and water. The pressure drops were measured across the sandpacks at residual oil saturation, and in the presence of mobile oil saturation. Measurements were made with and without 0.5% surfactant present in the liquid phase. The gas flow rate was 40 cc. per minute and gas composition was 20% nitrogen and 80% steam by volume. The liquid phase flow rate was about 3.25 milliliters per minute. The resistance factors were calculated for the surfactants listed below in Table III.

TABLE III

| Surfactant | Resistance Factor | | |
|---|---|---|---|
| | $R_1$ | $R_2$ | $R_3$ |
| Thermophoam BW-D | 1.0 | 0.31 | n.c. |
| Stepanflo 30 | 16 | 3.2 | n.c. |
| Dimer of $C_{11}$-$C_{14}$ AOS | 39 | 4.6 | n.c. |
| Dimer of $C_{15}$-$C_{18}$ AOS | 45 | 7.3 | n.c. | n.c. = not calculated

The results in Table III clearly indicate that alpha-olefin sulfonate dimers are superior to standard commercial alpha-olefin sulfonates.

What is claimed is:

1. A process for recovering hydrocarbons from a subterranean hydrocarbon bearing formation penetrated by at least one injection well and at least one production well, said process comprising:

forming a steam and alpha-olefin sulfonate dimer foam;

passing said steam and alpha-olefin sulfonate dimer foam into said formation and away from an injection well to assist the movement of hydrocarbons toward a production well; and recovering hydrocarbons at said production well.

2. The process according to claim 1 wherein the dimer comprises from about 0.01% to about 10% of the water phase of the steam.

3. The process according to claim 2 wherein a non-condensible gas in an amount of from about 1% to about 50% of the gaseous phase of said steam is injected into said steam prior to the injection of said steam at the injection well.

4. The process according to claim 3 wherein the non-condensible gas is selected from the group consisting of nitrogen, carbon dioxide, air, flue gas, $CH_4$, and carbon monoxide.

5. The process according to claim 4 wherein the alpha-olefin sulfonate dimer includes alpha-olefin sulfonate dimer in the range of $C_{10}$-$C_{48}$.

6. The process according to claim 5 further comprising injecting substantially pure steam into the formation prior to the injection of said steam and alpha-olefin sulfonate dimer foam.

7. The process according to claim 6 wherein substantially pure steam is injected into the formation after the injection of said steam and alpha-olefin sulfonate dimer.

8. The process according to claim 7 wherein the steam injection is tapered into a steam and alpha-olefin sulfonate dimer injection which is tapered into a steam injection.

9. The process according to claim 8 wherein the alpha-olefin sulfonate dimer is injected in its salt form or the acid form.

10. The process according to claim 9 wherein said alpha-olefin sulfonate dimer includes alpha-olefin sulfonate dimer in the range of $C_{22}$-$C_{40}$.

11. The process according to claim 10 wherein the alpha-olefin sulfonate dimer is synthesized according to the oligomerization process which comprises heating in the liquid phase the sulfonation product of the reaction of sulfur trioxide with a straight chain alkene hydrocarbon having a carbon atom content in the range of from about 5 to 24, wherein the heating is at a temperature above about 110° C. and below the carbonization temperature of the sulfonate, is effected in the substantial absence of water, and is continued for a period at least sufficient for a significant conversion of the sulfonate feed to the corresponding oligomeric disulfonic acid and wherein the resulting oligomeric sulfonic acid is neutralized with ammonia, an alkali metal base, a calcium base, a magnesium base or a mixture thereof.

12. The process according to claim 11 wherein said straight chain alkene hydrocarbon is a mixture in the range of $C_5$-$C_{24}$.

13. The process according to claim 12 wherein said straight chain alkene hydrocarbon mixture is in the range of $C_{11}$-$C_{20}$.

14. The process according to claim 1 wherein the alpha-olefin sulfonate dimer includes alpha-olefin sulfonate dimer in the range of $C_{10}$-$C_{48}$.

15. The process according to claim 14 wherein the alpha-olefin sulfonate dimer includes a mixture of alpha-olefin sulfonate dimer in the range of $C_{10}$-$C_{48}$.

16. The process according to claim 15 wherein the alpha-olefin sulfonate timer is synthesized according to the alpha-olefin sulfonate dimer is synthesized according to the oligomerization process which comprises heating in the liquid phase the sulfonation product of the reaction of sulfur trioxide with a straight chain alkene hydrocarbon having a carbon atom content in the range of from about 5 to 24, wherein the heating is at a temperature above about 110° C. and below the carbonization temperature of the sulfonate, is effected in the substantial absence of water, and is continued for a period at least sufficient for a significant conversion of the sulfonate feed to the corresponding oligomeric disulfonic acid.

17. The process according to claim 16 wherein said straight chain alkene hydrocarbon is a mixture in the range of $C_5$–$C_{24}$.

18. The process according to claim 17 wherein said straight chain alkene hydrocarbon mixture is in the range of $C_{11}$–$C_{20}$.

19. The process according to claim 18 wherein a non-condensible gas in an amount of from about 1% to about 50% of the gaseous phase of said steam is injected with said steam at the injection well.

20. The process according to claim 14 wherein said alpha-olefin sulfonate dimer includes alpha-olefin sulfonate dimer in the range of $C_{22}$–$C_{40}$.

21. The process according to claim 20 wherein the alpha-olefin sulfonate dimer includes a mixture of alpha-olefin sulfonate dimer in the range of $C_{22}$–$C_{40}$.

22. A process for recovering hydrocarbons from a subterranean hydrocarbon bearing formation penetrated by at least one injection well and at least one production well, said process comprising:
    forming a steam and alpha-olefin sulfonate dimer foam;
    injecting said steam and alpha-olefin sulfonate dimer foam at an injection well and into said formation;
    continuing to inject said steam and alpha-olefin sulfonate dimer foam through said injection well and into said formation to assist the movement of hydrocarbons towards a production well; and
    recovering hydrocarbons from a production well.

23. The process according to claim 22 wherein the dimer comprises from about 0.01% to about 10% of the liquid phase of the steam.

24. The process according to claim 23 wherein said foam further contains a non-condensible gas selected from the group consisting of nitrogen, carbon dioxide, air, flue gas, $CH_4$, and carbon monoxide.

25. The process according to claim 24 wherein said alpha-olefin sulfonate dimer includes alpha-olefin sulfonate dimer in the range of $C_{22}$–$C_{40}$.

26. The process according to claim 24 wherein the alpha-olefin sulfonate dimer is synthesized according to the oligomerization process which comprises heating in the liquid phase the sulfonation product of the reaction of sulfur trioxide with a straight chain alkene hydrocarbon having a carbon atom content in the range of from about 5 to 24, wherein the heating is at a temperature above about 110° C. and below the carbonization temperature of the sulfonate, is effected in the substantial absence of water, and is continued for a period at least sufficient for a significant conversion of the sulfonate feed to the corresponding oligomeric disulfonic acid and wherein the resulting oligomeric sulfonic acid is neutralized with ammonia, an alkali metal base, a calcium base, a magnesium base or a mixture thereof.

27. The process according to claim 26 wherein said straight chain alkene hydrocarbon is a mixture of $C_5$–$C_{24}$ hydrocarbons.

28. The process according to claim 27 wherein said mixture is a $C_{11}$–$C_{20}$ mixture.

29. The process according to claim 27 wherein said mixture is a $C_{15}$–$C_{20}$ mixture.

* * * * *

UNITED STATES PATENT AND TRADEMARK OFFICE
CERTIFICATE OF CORRECTION

PATENT NO. : 4,556,107
DATED : December 3, 1985
INVENTOR(S) : Duerksen et al

It is certified that error appears in the above-identified patent and that said Letters Patent are hereby corrected as shown below:

Col. 4, Line 1, "The form", should read --The foam--.

Claim 16, Line 1. "The process according to claim 15 wherein the alpha-olefin sulfonate timer is synthesized according to the alpha-olefin sulfonate dimer is synthesized according to", should read, --The process according to claim 15 wherein the alpha-olefin sulfonate dimer is synthesized according to...--.

Signed and Sealed this

Fifteenth Day of July 1986

[SEAL]

Attest:

Attesting Officer

DONALD J. QUIGG

Commissioner of Patents and Trademarks